No. 608,452. Patented Aug. 2, 1898.
L. W. GREENLEAF.
WHEELWRIGHT MACHINE.
(Application filed Aug. 18, 1897.)

(No Model.) 4 Sheets—Sheet 1.

WITNESSES
J. Gregg Pool
J. O. Johnson

INVENTOR
Latham W. Greenleaf
by Herbert W. T. Jenner
Attorney

No. 608,452. Patented Aug. 2, 1898.
L. W. GREENLEAF.
WHEELWRIGHT MACHINE.
(Application filed Aug. 18, 1897.)

(No Model.) 4 Sheets—Sheet 2.

WITNESSES
J. Strigg Poole
J. O. Johnson

INVENTOR
Latham W. Greenleaf
by Herbert W. T. Jenner
Attorney

THE NORRIS PETERS CO., PHOTO-LITHO., WASHINGTON, D. C.

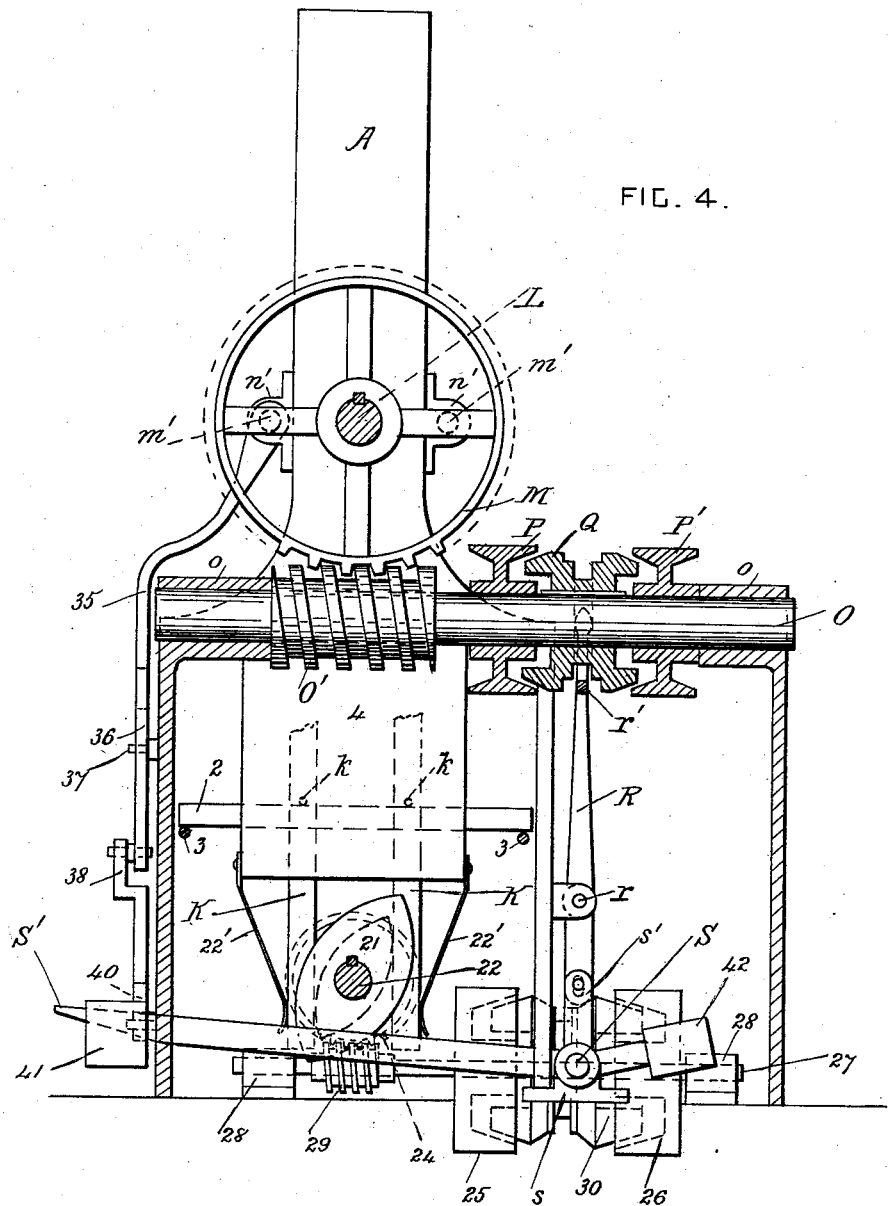

No. 608,452. Patented Aug. 2, 1898.
L. W. GREENLEAF.
WHEELWRIGHT MACHINE.
(Application filed Aug. 18, 1897.)
(No Model.) 4 Sheets—Sheet 4.
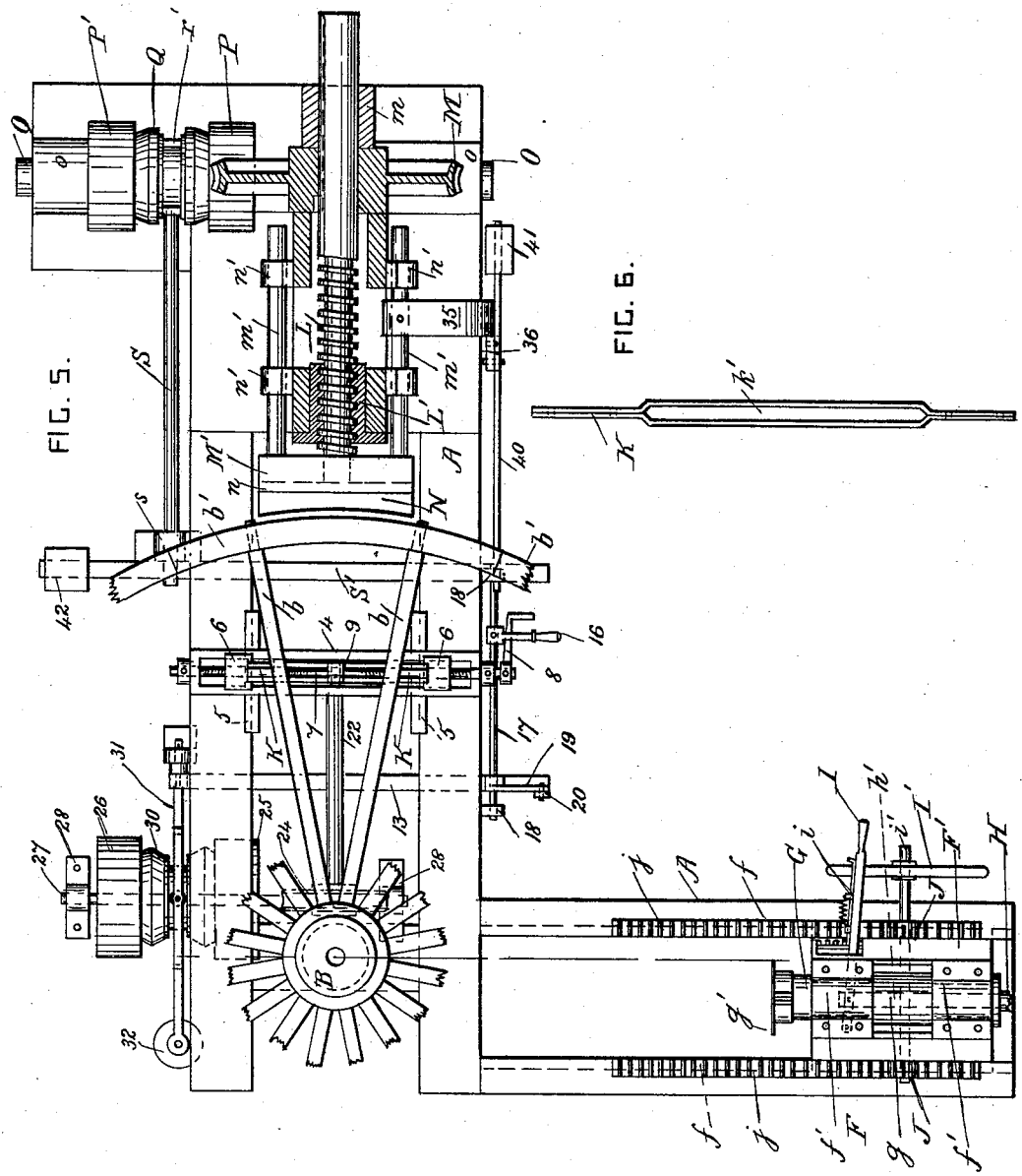
WITNESSES
INVENTOR
Latham W. Greenleaf
by Herbert W. T. Jenner
Attorney

UNITED STATES PATENT OFFICE.

LATHAM W. GREENLEAF, OF TERRE HAUTE, INDIANA, ASSIGNOR OF ONE-HALF TO JAMES C. COUPER, OF SAME PLACE.

WHEELWRIGHT-MACHINE.

SPECIFICATION forming part of Letters Patent No. 608,452, dated August 2, 1898.

Application filed August 18, 1897. Serial No. 648,622. (No model.)

*To all whom it may concern:*

Be it known that I, LATHAM W. GREENLEAF, a citizen of the United States, residing at Terre Haute, in the county of Vigo and State of Indiana, have invented certain new and useful Improvements in Wheelwright-Machines; and I do hereby declare the following to be a full, clear, and exact description of the invention, such as will enable others skilled in the art to which it appertains to make and use the same.

This invention relates to wheelwright-machines; and it consists in the novel construction and combination of the parts hereinafter fully described and claimed.

Figure 1:
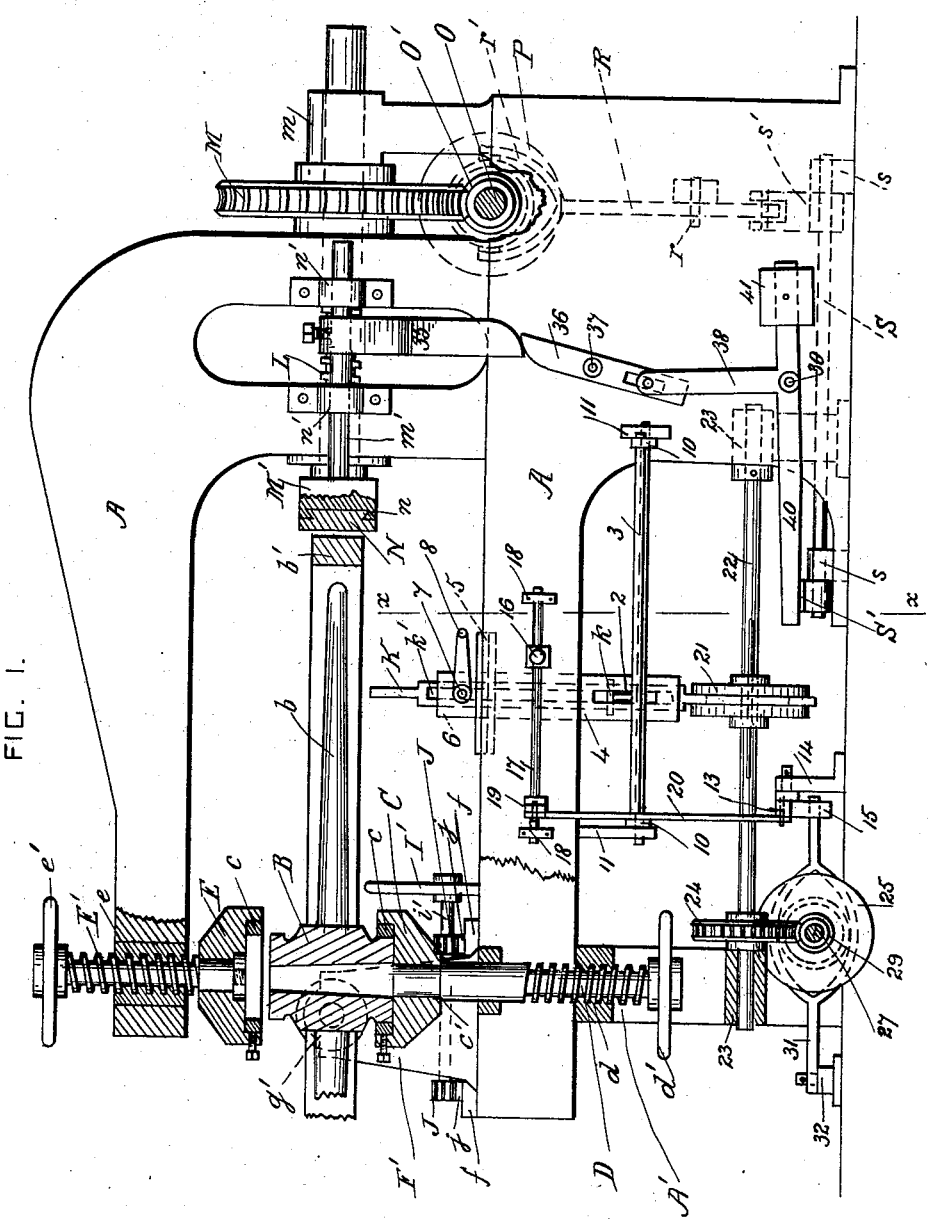
Figure 2:
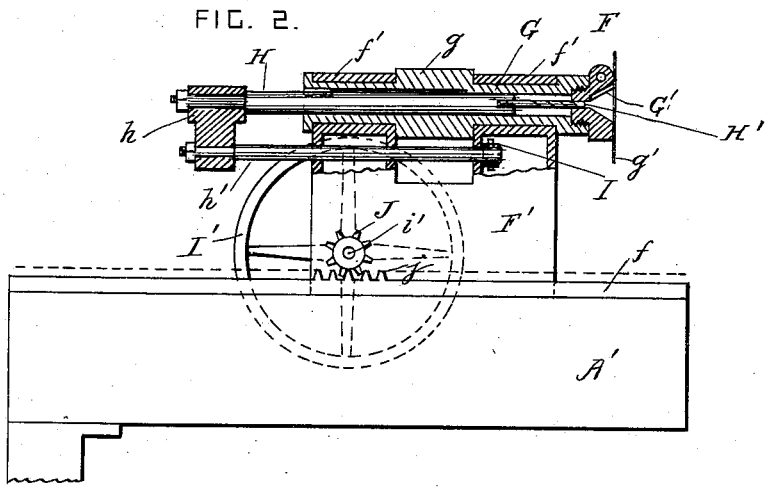
Figure 3:
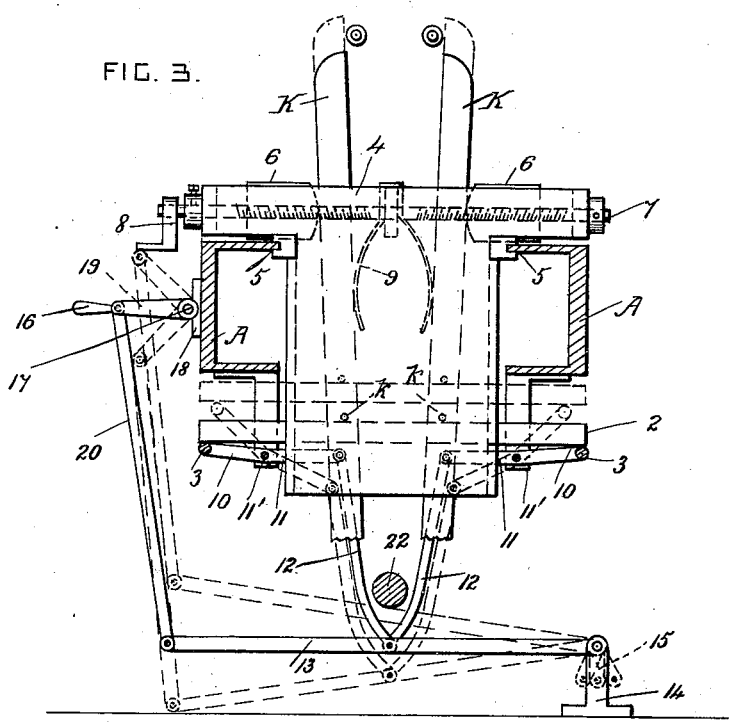

In the drawings, Figure 1 is a side view of the machine, partly in section. Fig. 2 is a longitudinal section through the chamfering devices. Fig. 3 is a cross-section taken on the line $x\,x$ in Fig. 1 and showing the devices for springing the spokes. Fig. 4 is a rear view of the mechanism for driving the press. Fig. 5 is a plan view of the machine, partly in section. Fig. 6 is a detail view of one of the levers K.

A is the main frame of the machine, which is of any approved construction, and A' is an auxiliary frame secured to the main frame and forming a support for the chamfering devices.

B is the hub of a wheel, $b$ are some of its spokes, and $b'$ are segments of its rim.

C is a socket for engaging with the lower part of the wheel-hub, and $c$ is a loose ring secured in the socket C by a set-screw. Rings $c$ of different internal diameters are used, so that wheel-hubs of all sizes may be supported in the socket. The socket C is journaled on the upper end portion of a screw D and rests on the shoulder $c'$. The screw D engages with a nut $d$, secured to the frame, and $d'$ is a hand-wheel secured on the screw, so that it may be turned in its nut to adjust the height of the wheel-hub.

E is a socket journaled on the lower end portion of a screw E', which engages with a nut $e$ in the upper part of the frame A. The screw E' is provided with a hand-wheel $e'$ for revolving it, and the socket E has a loose ring $c$, similar to the socket C, so that the upper part of a hub of any size may be supported by it.

F are the devices for chamfering the spoke-tenons, cutting them off, and boring the dowel-holes. These devices are supported by a bracket F', which is slidable longitudinally in guides $f$, secured to the auxiliary frame A'.

G is a tubular shaft journaled in bearings $f'$ on the bracket F' and provided with a driving-pulley $g$ for revolving it.

G' is the chamfering-bit, secured to the front end portion of the shaft G, and $g'$ is a circular saw secured to the said bit. The shaft G is not arranged radial of the center of the wheel, but has its axis arranged parallel to a line drawn through the center of the wheel, so that the periphery of the saw comes on the said line. When arranged in this manner, the saw can cut off the tenons, which project through the wheel-rim, close up to the rim, so that they do not have to be trimmed subsequently by hand.

H is a shaft which is splined in the tubular shaft G, and $h$ is a bracket carried by the rear end portion of the shaft H.

H' is a boring-bit secured to the front end portion of the shaft H and slidable in a hole in the chamfering-bit. A rod $h'$ is secured to the bracket $h$ and is slidable in a hole in the bracket F'.

I is a hand-lever pivoted to the bracket F and connected to the rod $h'$, so that the said rod can be slid back and forth. The lever I is provided with a spring-catch $i$, which engages with notches in the bracket F'. The dowel-holes bored in the joints between the segments of the wheel-rim are slightly inclined; but this is no disadvantage, nor is it any disadvantage that the chamfers are a little irregular on the ends of the spoke-tenons, because these ends are subsequently cut off.

The bracket F' is moved back and forth in its guides $f$ by means of a hand-wheel I'. This hand-wheel is secured on a shaft $i'$, which is journaled crosswise in the bracket F'.

J are toothed pinions secured on the shaft $i'$, which gear into toothed racks $j$ on the guides.

The saw and chamfering-bit are adjusted by moving the bracket F' bodily, and the boring-bit is slid in and out by means of the hand-lever.

After the tenons of the spokes have been chamfered the segments of the rim, which are provided with holes, have to be placed on them.

K are two levers for springing two adjacent spokes toward each other, so that a segment can be slipped by hand onto the chamfered ends of the tenons. The levers K are supported by pins $k$, which rest upon a cross-bar 2. The cross-bar 2 passes through slots $k'$ in the levers K, and its ends are slidable upon two carrier-bars 3. The upper parts of the levers K work in a frame 4, which is slidable in the main frame A radially of the wheel-hub. The frame 4 is provided with grooves 5, which engage with the upper edges of the frame. The frame 4 is slid back and forth, so that the levers K may engage with the spokes of wheels of different diameters. The levers engage with the spokes close behind their tenons.

Fulcrum-blocks 6 are slidable transversely in the upper part of the frame 4, and 7 is a shaft provided with right and left hand screw-threads which engage with the respective fulcrum-blocks. The shaft 7 is journaled in the frame 4 and is provided with a crank 8 for revolving it. The levers K bear against the fulcrum-blocks, and the normal distance apart of their upper end portions is regulated by the position of the fulcrum-blocks. A double spring 9 is secured to the frame 4 and operates to press the levers K against their fulcrum-blocks.

The carrier-bars 3 are made long enough to permit the levers K to be slid back and forth for the greatest distance desirable, and they are supported by arms 10, which are pivoted to brackets 11', secured to the frame A. Two of the arms 10 have prolongations 11, and 12 are connecting-rods pivoted to the free end portions of the prolongations 11 and to the long horizontal arm of a bell-crank lever 13. The bell-crank lever 13 is pivoted to a stationary fulcrum-bracket 14 and is provided with a short vertical arm 15.

A hand-lever 16 is supported by the frame A at a convenient distance from the ground, being secured on a shaft 17, which is journaled in brackets 18. An arm 19 projects from the shaft 17, and 20 is a rod pivotally connected to the free end portion of the arm 19 at one end and to the free end portion of the bell-crank lever at the other end. The levers K normally rest in the positions shown in full lines in Fig. 3, and after the wheel-hub has been turned to bring two of the spokes over and between the levers K the said levers are raised to the positions shown in the dotted lines by means of the hand-lever 16.

A double cam 21 is arranged between the lower end portions of the levers K, and 22' are springs secured to the frame 4 and operating to press the lower end portions of the levers K against the double cam. The double cam 21 is splined on a shaft 22, which is journaled in stationary bearings 23, and 24 is a worm-wheel secured on the said shaft and operating to oscillate it.

Belt-pulleys 25 and 26 are journaled on a shaft 27, which is journaled in stationary bearings 28, and 29 is a worm secured on the shaft 27 and gearing into the worm-wheel 24. A double friction-clutch member 30 is splined on the shaft 27 between the pulleys 25 and 26 and couples the said pulleys to the shaft according to the direction in which it is moved, the said pulleys being provided with clutch members for the said double-clutch member to engage with.

A lever 31 is pivoted at one end to a stationary bracket 32, and its other end is pivoted to the vertical arm 15 of the bell-crank lever 13. The middle part of the lever 31 is operatively connected with the double-clutch member in any approved manner.

When the levers K are raised into engagement with the spokes, the worm-wheel is simultaneously set in motion by the movement of the double-clutch member, and the double cam is revolved, so that it thrusts apart the lower end portions of the levers K, thereby springing the spokes toward each other. A segment of the rim is then slipped onto the chamfered ends of the tenons by hand, and the hand-lever 16 is subsequently raised, so as to lower the levers K and move the double cam in the reverse direction by shifting the double-clutch member. The levers K are set to suit the spokes of different wheels by adjusting the positions of the fulcrum-blocks.

A press is arranged at one end of the frame A for forcing the segments of the rim onto the tenons of the spokes. The levers for springing the spokes are preferably arranged between the press and the sockets C and E, so that the segment is in a position to be forced onto the tenons when placed on their ends; but the levers K may be arranged in other positions, if desired.

Any approved construction of press can be used and may be hydraulic or pneumatic or worked by cam, eccentric, or other equivalent mechanism. A screw-press is preferably employed. L is the screw of the press, which engages with a nut L', secured to the frame A. A bearing $m$ is provided for the rear end portion of the screw-shaft to run in.

M is a worm-wheel splined on the screw-shaft and working between the bearing $m$ and the frame A.

M' is a cross-head in which the front end portion of the screw is journaled, and $m'$ are guide-bars secured to the cross-head and slidable in guides $n'$, secured to the frame A. The guide-bars $m'$ are arranged parallel with the screw, and they prevent the cross-head from revolving.

The front of the cross-head has a dovetailed socket $n$, and N is a block provided with a concave face and slidable in the socket $n$. Different blocks are slid into the socket, according to the curvature of the sections of the wheel-rim.

O is a shaft which is journaled in bearings $o$, and O' is a worm secured on the shaft O and engaging with the worm-wheel M.

P and P' are two belt-pulleys which are secured on the shaft O and which are also friction-clutch members. A double friction-clutch member Q is splined on the shaft O between the pulleys P and P'. The pulleys are driven in opposite directions, and the motion of the screw is changed by sliding the double-clutch member on its shaft.

R is a clutch-lever pivoted on a pin r, projecting from the frame and provided with a forked upper end r', which is operatively connected with the double-clutch member.

S is a rock-shaft journaled in stationary bearings s at the lower part of the machine. A foot-lever S' is secured on the rock-shaft S and projects at the front part of the press. An arm s' is also secured on the rock-shaft S and is pivotally connected with the lower end portion of the clutch-lever R.

A tappet 35 is secured on one of the guide-bars m' and projects downwardly. An arm 36 is pivoted on a pin 37, projecting from the frame A, and the tappet 35 moves the upper end portion of the arm 36 when it strikes it. A T-shaped lever 38 is pivoted on a pin 39, projecting from the frame A, and its vertical arm is pivotally connected to the lower part of the arm 36.

The long horizontal arm 40 of the lever 38 is arranged over the foot-lever S', and its short horizontal arm is provided with a weight 41.

The foot-lever S' is provided with a weight 42 on its rear end, which holds its front end portion raised. When the front end of the foot-lever is depressed, the double-clutch member is moved in one direction, and the screw is moved forward so as to force on the segment. When the foot-lever is released, the weight 42 operates the double-clutch member, and the screw is run back. Shortly before the screw completes its backward movement the tappet 35 strikes the arm 36 and causes the T-shaped lever to partially depress the foot-lever, thereby placing the double-clutch member in its middle position and stopping the press. After the segment has been pressed on the wheel is turned around and the projecting chamfered end portions of the tenons are cut off by the saw, and the holes are bored for the dowel-pins by means of the boring-bit, as hereinbefore described.

When a segment of the rim is placed in position with its holes opposite the tenons of the spokes, the hand-lever 16 is first raised to its normal and midway position, thereby throwing the double cam out of operation, but not lowering the levers K clear of the spokes. The spokes are now held in position and the press is started by depressing the foot-lever S. When the segment has been started onto the tenons, the hand-lever 16 is raised to its full extent, so as to lower the levers K and move the double cam in the reverse direction by shifting the double-clutch member. When the levers K have been lowered, the hand-lever is again placed in its midway position, thereby throwing the double cam out of gear.

If desired, the spokes can be sprung toward each other by means of the fulcrum-blocks instead of by the use of the double cam.

What I claim is—

1. In a wheelwright-machine, the combination, with a frame, and a support for the wheel-hub carried thereby; of a press for forcing on the rim-segments, tools for chamfering and trimming the spoke-tenons, devices for springing the spokes, and driving mechanisms for operating all the said tools, said tools being arranged to operate successively as the wheel is revolved, substantially as set forth.

2. In a wheelwright-machine, the combination, with a frame, and a support for the wheel-hub carried thereby; of a press for forcing on the rim-segments, a circular saw for trimming the tenons, a bit for chamfering the tenons, a bit for boring the dowel-pin holes, devices for springing the spokes, and driving mechanisms for operating all the said tools, said press and bits being arranged in substantially the same horizontal plane and operating successively on the parts of the wheel as the said wheel is revolved, substantially as set forth.

3. The combination, with a tubular driving-shaft carrying a bit, and a slidable shaft splined in the tubular shaft and also carrying a bit; of locking mechanism connecting the two said shafts, and a bracket supporting the said shafts and slidable longitudinally with them so that both shafts are moved simultaneously by the bracket, the internal shaft being slidable in the tubular shaft when unlocked, substantially as set forth.

4. The combination, with a frame provided with a guide, and a bracket slidable in the guide; of a tubular driving-shaft journaled in the said bracket and provided with a bit, a slidable shaft splined in the said tubular shaft and also provided with a bit, an operating-lever for sliding the internal shaft, said lever being pivoted to the said bracket and provided with a locking device, and means for sliding the said bracket in its guide; substantially as set forth.

5. The combination, with a frame, a slidable bracket supported by the frame, and means for sliding the said bracket back and forth; of a tubular driving-shaft journaled in the said bracket and provided with a chamfering-bit, a slidable shaft splined to the said tubular shaft and provided with a boring-bit, means for sliding the said slidable shaft back and forth in the said tubular shaft, and locking devices carried by the said bracket and securing the said slidable shaft relatively of the said tubular shaft, substantially as set forth.

6. The combination, with a main frame, and a support for the wheel-hub carried by the said frame; of a frame slidable horizontally in the main frame and radially of the said support, and mechanism for springing the wheel-spokes carried by the said slidable frame, substantially as set forth.

7. The combination, with a support for the wheel-hub and spokes, of two pivoted levers engaging with two adjacent spokes, and means for moving the said levers simultaneously in opposite directions, whereby the said spokes are sprung toward each other, substantially as set forth.

8. The combination, with a support for the wheel-hub and spokes, of two levers, fulcrums for the said levers, means for sliding the said levers longitudinally into and out of engagement with two adjacent spokes, and means for moving the said levers upon their fulcrums simultaneously in opposite directions, whereby the said spokes are sprung toward each other, substantially as set forth.

9. The combination, with a main frame, and a driving-shaft; of a frame slidable horizontally in the said main frame, levers pivotally supported in the slidable frame and operating to spring the spokes, and a revoluble double cam splined on the said shaft and working between the lower end portions of the said levers, substantially as set forth.

10. The combination, with levers for springing the spokes, and means for operating the said levers; of a vertically-movable support for the said levers, means for raising the said support, and clutch mechanism operating to place in action the said means for operating the levers when the said levers are raised, substantially as set forth.

11. The combination, with levers for springing the spokes, a driving-shaft, and a double cam mounted thereon and arranged to operate the said levers; of a vertically-movable support for the said levers, operating mechanism for raising the said support, driving devices, and clutch mechanism actuated by the said operating mechanism and coupling the said driving-shaft to the said driving devices when the said levers are raised, substantially as set forth.

12. The combination, with levers for springing the spokes, and a support for the said levers; of slidable fulcrum-blocks for the said levers to bear against, and means for adjusting the positions of the said blocks, substantially as set forth.

13. The combination, with levers for springing the spokes, and a support for the said levers; of slidable fulcrum-blocks for the said levers to bear against, and a revoluble shaft provided with right and left hand screw-threads which engage with the respective fulcrum-blocks and afford a means for adjusting them simultaneously, substantially as set forth.

14. The combination, with levers for springing the spokes provided with slots, of a cross-bar passing through the said slots and pivotally supporting the said levers, and means for raising and lowering the said cross-bar, substantially as set forth.

15. The combination, with levers for springing the spokes, and a laterally-slidable support for the said levers; of carrier-bars arranged under the said support, and means for raising and lowering the said carrier-bars, substantially as set forth.

16. The combination, with levers for springing the spokes, and a support for the said levers; of fulcrum-blocks for the upper parts of the said levers to bear against, a double cam arranged between the lower parts of the said levers, and springs pressing the said levers against the said fulcrum-blocks and cam, substantially as set forth.

17. The combination, with pivoted arms provided with prolongations, and carrier-bars supported by the said arms; of levers for springing the spokes, a support for the said levers slidable laterally on the said carrier-bars, a pivoted operating-lever, and connecting-rods coupling the free end portions of the said prolongations with the said operating-lever, substantially as set forth.

18. The combination, with levers for springing the spokes, a cam and a driving-shaft for operating the said levers, and means for raising the said levers; of driving devices, clutch mechanism for coupling the said driving devices to the said shaft, a pivoted bell-crank lever having one of its arms connected to the said means for raising the levers, a hand-lever and intermediate connections for operating the said bell-crank lever, and means for operating the said clutch mechanism connected to the other arm of the said bell-crank lever, substantially as set forth.

19. In a wheelwright-machine, the combination, with a support for the wheel-hub, and a press; of means for springing the spokes arranged between the said support and press, substantially as set forth.

In testimony whereof I affix my signature in presence of two witnesses.

LATHAM W. GREENLEAF.

Witnesses:
WM. A. BRAMAN,
H. P. BARTLETT.